Nov. 13, 1962   R. E. BARRETT   3,064,234
SONAR SYSTEM
Filed Nov. 7, 1958   2 Sheets-Sheet 1

INVENTOR.
ROBERT E. BARRETT
BY
Louis B. Applebaum
ATTORNEY

Nov. 13, 1962  R. E. BARRETT  3,064,234
SONAR SYSTEM
Filed Nov. 7, 1958  2 Sheets-Sheet 2

INVENTOR.
ROBERT E. BARRETT

United States Patent Office 3,064,234
Patented Nov. 13, 1962

3,064,234
SONAR SYSTEM
Robert E. Barrett, New Haven, Conn., assignor, by mesne assignments, to the United States of America as represented by the Secretary of the Navy
Filed Nov. 7, 1958, Ser. No. 772,641
4 Claims. (Cl. 340—3)

This invention relates to an improved echo-ranging system and particularly to a sonar system providing an improved signal-to-noise ratio and a longer period of time, relative to the basic pulse repetition period, during which target echoes are received.

In ordinary echo-ranging systems, information is received from a particular target during only a small fraction of the time, this fraction being a product of the pulse length and the basic pulse repetition rate. It is desirable to increase this fraction of time, especially in view of the fact that with ordinary methods of search only a small number of good echoes can be received from any particular target.

The objects and advantages of the present invention are accomplished by transmitting sets of search pulses, each set consisting of a plurality of time-spaced pulses per basic pulse repetition period, the basic repetition period being determined by the maximum desired range of the sonar system. The pulses are differentiable from each other with respect to some electrical characteristic, preferably by being different in frequency. The return signal from each pulse in a given set is received, detected and delayed in time so that all corresponding returns in the set are in time synchronism just as though all pulses in the set had been transmitted simultaneously. The delayed signals are then added together and displayed by some display means, such as a cathode ray tube.

An object of the invention is to increase the period of time, relative to the basic pulse repetition period of an echo-ranging system, during which echoes are received from targets.

Another object is to improve the signal-to-noise ratio of an echo-ranging system.

A further object is to improve the efficiency of a sonar system without increasing the complexity of the system to any great extent.

Other objects and many of the attendant advantages of this invention will be readily appreciated as the same becomes better understood by reference to the following detailed description when considered in connection with the accompanying drawings wherein.

Figure 1:
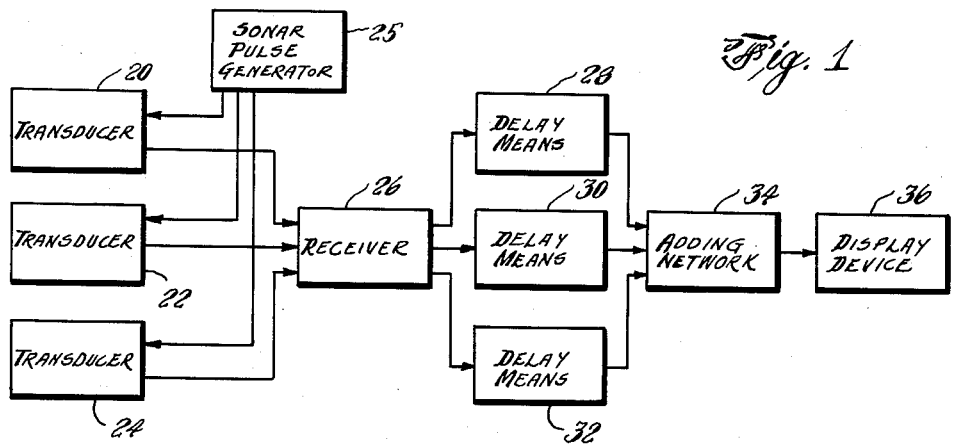
FIG. 1 is a block diagram showing the invention in schematic form.

The basic system of the invention is shown in FIG. 1 in schematic block form. A sonar pulse generator 25 capable of generating a pluarlity of electrical pulses is connected to an equal number of transducers 20, 22 and 24. (The number of pulses per set and the number of transducers is arbitrarily chosen here as three; however, any number of pulses and transducers may be employed from two upwards.)

The transducers 20, 22, 24, which change electrical to compressional wave energy and may, for example, be of the piezoelectric type, are each designed to oscillate at a different carrier frequency so that the return signal or echoes from each pulse may be distinguished from the return signal of any other pulse in a set.

Figure 2:
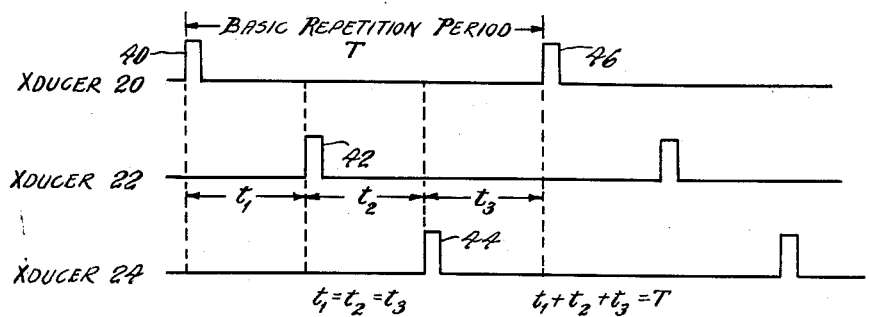
FIG. 2 is a diagram of the time relationships of the various pulses in a set.

FIG. 2 shows the relationship of the pulses in a set. Pulses 40, 42 and 44, which are transmitted by transducers 20, 22 and 24 respectively, constitute a set. The basic repetition period of the system is the time between the start of any successive two pulses (such as 40 and 46) transmitted by the same transducer. The pulses of the other transducers are time-spaced within this period and in FIG. 2 are indicated as dividing the period evenly into thirds, although even division is not a necessary condition.

The return signals from these transmitted pulses are received by a wide-band sonar receiver 26 which contains provision for maintaining the separate identity of the signals from each transducer. Alternatively, a separate receiver could be used in conjunction with each transducer. The detected outputs, comprising signals containing both noise and echo components, are then fed into delay means 28, 30 and 32 which delay the returns from each pulse in a set so that all corresponding echoes from that set of pulses appear at the adding network 34 in time sychronism. (Corresponding echoes are echoes which are returned by the same target.) In actual practice, only two delays would be necessary—i.e., the returns from pulses 40 and 42 would be delayed to coincide with the return from pulse 44. However, to make the case more general, three delay means are illustrated.

The delayed detected signals are added in an adding network 34 (e.g., see FIG. 1.7(c) of "Electronic Analog Computers," by Korn and Korn, 1st ed., published in 1952 by McGraw-Hill Book Co., Inc., N.Y.), which may be any conventional adding network, and the summed signal is displayed by a display device 36, which may, for example, be a cathode ray tube on which the signal is presented by means of an A-type scan.

An advantage of adding the returns from different pulses is that an echo from a target will be of the same approximate phase and amplitude each time whereas the noise signal will vary in phase and amplitude in each return. Adding the returns in each set after time synchronization will provide a signal in which the noise returns tend to cancel out whereas the target echoes add together, thereby increasing the signal-to-noise ratio by a considerable amount.

Figure 3:
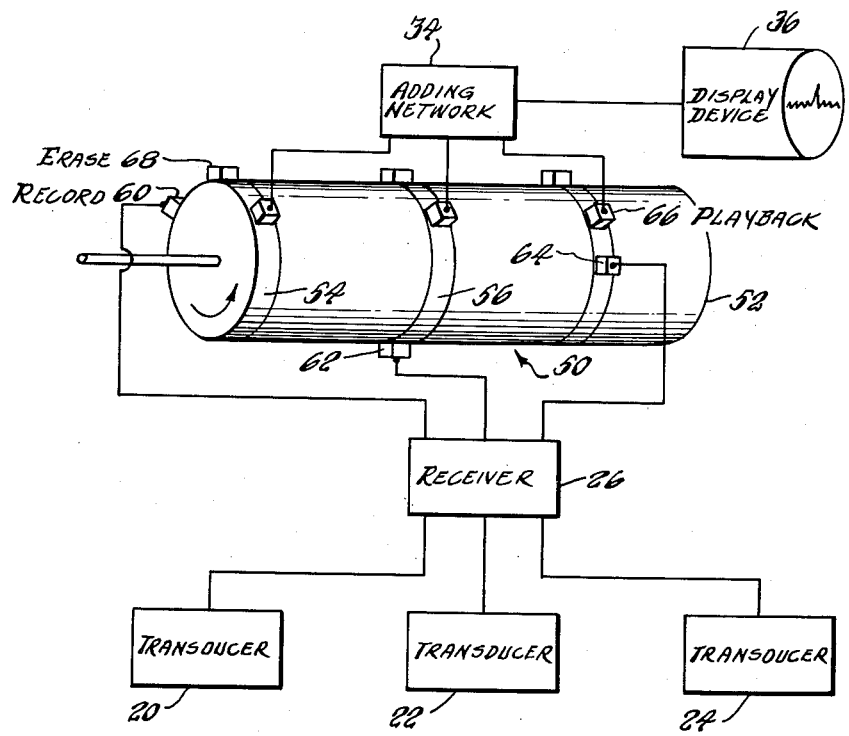
FIG. 3 is a diagrammatic representation of a delay means that may be employed with the invention.

The delay means may be of any suitable type known to the art, such as delay lines. A magnetic-tape delay means 50 which is suitable is shown in FIG. 3. This consists of a rotating drum 52 which carries three magnetic tapes 54, 56, 58 on its circumference. Recording heads 60, 62 and 64 are spaced at equal angular intervals around the circumference of the drum 52, the intervals corresponding to the amount by which it is desired to delay the signal received by its associated transducer.

The recorded signals are simultaneously picked up by the playback heads 66 and fed to the adding network 34. The recorded signals are then erased by erasing heads 68.

The drum 52 rotates at a speed which corresponds to the basic repetition rate of the sonar system and keying of the system is synchronized with its rotation.

Obviously many modifications and variations of the present invention are possible in the light of the above teachings. It is therefore to be understood that within the scope of the appended claims the invention may be practiced otherwise than as specifically described.

I claim:

1. An echo system comprising, in combination: means for transmitting sets of pulse signals, each set having a pulse repetition period which constitutes the basic pulse repetition period of the system, each pulse in each set being time-spaced from the others and being differentiable from the others in at least one electrical characteristic; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing said delayed detected signals, an output being obtained from said summing means even when a single one of said delayed detected signals is applied thereto; and means for indicating the output of said summing means.

2. An echo system comprising, in combination: means for transmitting sets of pulse signals, each set having a pulse repetition period which constitutes the basic pulse repetition period of the system, each pulse in any set being time-spaced from the others and being transmitted at a different carrier frequency from the others; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing the delayed detected signals of each set, an output being obtained from said summing means even when a single one of said delayed detected signals is applied thereto; and means for indicating the output of said summing means.

3. An echo system comprising, in combination: means for transmitting sets of pulse signals, each set having a pulse repetition period which constitutes the basic pulse repetition period of the system, each pulse in any set being equally time-spaced from the others and being transmitted at a different carrier frequency from the others; means for receiving return signals from said transmitted pulses and for deriving a separate detected signal from the received signals resulting from each pulse; means for delaying each detected signal in inverse relationship to the time-spacing of its associated transmitted pulse with respect to the start of the basic repetition period of the system so that the returns from each pulse in a set are in time synchronism with the corresponding returns from the other pulses in that set; means for summing the delayed detected signals of each set, an output being obtained from said summing means even when a single one of said delayed detected signals is applied thereto; and means for indicating the output of said summing means.

4. A sonar system comprising, in combination: a sonar pulse generator adapted to produce sets of pulse signals, each set having a pulse repetition period which constitutes the basic pulse repetition period of the system, each pulse in any set being time-spaced from the others; a plurality of transducers equal in number to the number of pulses in each set, each pulse in a set being applied to a different one of said transducers but the corresponding pulses in different sets being applied to the same transducer, each transducer operating at a different carrier frequency from any of the others, said transducers radiating pulse energy and receiving energy reflected from targets; receiver means connected to said transducers for producing a separate detected signal from the received energy associated with each pulse in any set means for delaying each detected signal by an amount inversely related to the time-spacing of its associated transmitted pulse with respect to the start of the basic repetition period of the system so that the reflected energy from each pulse in a set is in time synchronism with the corresponding reflected energy from the other pulses in that set; means for summing the delayed detected signals of each set, an output being obtained from said summing means even when a single one of said delayed detected signals is applied thereto; and means for indicating the output of said summing means.

References Cited in the file of this patent

UNITED STATES PATENTS

| | | |
|---|---|---|
| 2,166,991 | Guanella | July 25, 1939 |
| 2,268,587 | Guanella | Jan. 6, 1942 |
| 2,400,309 | Kock | May 14, 1946 |
| 2,624,876 | Dicke | June 6, 1953 |
| 2,676,317 | Purington | Apr. 20, 1954 |

Notice of Adverse Decision in Interference

In Interference No. 94,666 involving Patent No. 3,064,234, R. E. Barrett, SONAR SYSTEM, final judgment adverse to the patentee was rendered May 27, 1965, as to claims 1, 2 and 3.

[*Official Gazette July 20, 1965.*]